US007365148B2

(12) United States Patent
Ono et al.

(10) Patent No.: US 7,365,148 B2
(45) Date of Patent: Apr. 29, 2008

(54) POLYCARBONATE AND PROCESS FOR PRODUCING THE SAME

(75) Inventors: Aya Ono, Yamaguchi (JP); Kiyotsuna Toyohara, Yamaguchi (JP); Hiroyoshi Minematsu, Yamaguchi (JP); Yuuichi Kageyama, Kanagawa (JP)

(73) Assignee: Teijin Limited, Kanagawa (JP)

( * ) Notice: Subject to any disclaimer, the term of this patent is extended or adjusted under 35 U.S.C. 154(b) by 181 days.

(21) Appl. No.: 10/560,934

(22) PCT Filed: Jun. 14, 2004

(86) PCT No.: PCT/JP2004/008648

§ 371 (c)(1), (2), (4) Date: Dec. 15, 2005

(87) PCT Pub. No.: WO2004/111106

PCT Pub. Date: Dec. 23, 2004

(65) Prior Publication Data

US 2006/0149024 A1 Jul. 6, 2006

(30) Foreign Application Priority Data

Jun. 16, 2003 (JP) ............................ 2003-171111
Jun. 16, 2003 (JP) ............................ 2003-171122
Apr. 5, 2004 (JP) ............................ 2004-111045

(51) Int. Cl.
*C08G 64/00* (2006.01)

(52) U.S. Cl. ...................... 528/196; 502/150; 525/436; 528/198; 528/271; 528/272

(58) Field of Classification Search ................ 502/150; 525/436; 528/196, 198, 271, 272
See application file for complete search history.

(56) References Cited

U.S. PATENT DOCUMENTS 4,506,066 A 3/1985 Medem et al.

FOREIGN PATENT DOCUMENTS

GB 1079686 8/1967
JP 56-110723 A 9/1981
JP 7-126221 5/1995

OTHER PUBLICATIONS

Dietrich Braun and Matthias Bergmann; Fortschrittsbericht • Progress Report, 1,4:3,6-Dianhydrohexite als Bausteine für Polymere; Journal für praktische Chemie Chemiker-Zeitung, vol. 334 (1992) pp. 298-310.

Hans R. Kricheldorf, Shih-Jieh Sun, and Andreas Gerken; Polymers of Carbonic Acid. 22. Cholesteric Polycarbonates Derived from (S)-((2-Methylbutyl)thio)hydroquinone or Isosorbide; Macromolecules 1996, vol. 29, pp. 8077-8082.

Masahiko Okada, Makito Yokoe, Keigo Aoi; Biodegradable Polymers Based on Renewable Resources. VI. Synthesis and Biodegradability of Poly(ester carbonate)s Containing 1,4:3,6-Dianhydro-D-glucitol and Sebacic Acid Units; Journal of Applied Polymer Science, vol. 86, pp. 872-880 (2002).

Hans R. Kricheldorf, Shih-Jieh Sun; Polymers of carbonic acid, 23[a] Photoreactive cholesteric polycarbonates based on isosorbide, 4,4'-dihydroxychalcone and 4,4'-dihydroxybiphenyl; Macromolecular Chemistry and Physics, vol. 198, pp. 2197-2210 (1997).

Hans R. Kricheldorf, Shih-Jieh Sun, Ching-Ping Chen, The-Chou Chang; Polymers of Carbonic Acid. XXIV. Photoreactive, Nematic or Cholesteric Polycarbonates Derived from Hydroquinone-4-hydroxybenzoate 4,4'-Dihydroxychalcone and Isosorbide; Journal of Polymer Science: Part A, vol. 35, pp. 1611-1619 (1997).

Shih-Jieh Sun, Gert Schwarz, Hans R. Kricheldorf, Teh-Chou Chang; New Polymers of Carbonic Acid. XXV. Photoreactive Cholesteric Polycarbonates Derived from 2,5-Bis(4'-hydroxybenzylidene)cyclopentanone and Isosorbide; Journal of Polymer Science: Part A, Polymer Chemistry, vol. 37, pp. 1125-1133 (1999).

D.D. Dixon and M.E. Ford; Mechanism of Poly(Alkylene Carbonate) Formation; Journal of Polymer Science: Polymer Letters Edition, vol. 18, pp. 599-602 (1980).

Jyuhou Matsuo, Fumio Sanda, Takeshi Endo; Cationic ring-opening polymerization behavior of an aliphatic seven-membered cyclic carbonate, 1,3-dioxepan-2-one; Macromolecular Chemistry and Physics, vol. 199, pp. 97-102 (1988).

Polycarbonate resin handbook, edited by Seiichi Honma, Nikkan Kogyo Shinbun Co., p. 21 (1992).

Okada et al, Abstract of the seventh open symposium on "Polymers with low environmental loads": Construction of a sustainable material system based on production of plastics with Scientific Research on Priority Areas (B) supported by Grant-in Aid for Scientific Research of Ministry of Education, Culture, Sports, Science and Technology, pp. 26-29 (2002).

Makito Yokoe, Keigo Aoi, Masahiko Okada; Biodegradable Polymers Based on Renewable Resources. VII. Novel Random and Alternating Copolycarbonates from 1,4:3,6-Dianhydrohexitols and Aliphatic Diols; Journal of Polymer Science: Part A: Polymer Chemistry, vol. 41, pp. 2312-2321 (2003).

*Primary Examiner*—Terressa Boykin
(74) *Attorney, Agent, or Firm*—Sughrue Mion, PLLC

(57) ABSTRACT

A polycarbonate containing an ether diol residue producible from a polysaccharide and expressed by the following formula (1), (1)

and a diol residue expressed by the following formula (2)

$$—O—(C_mH_{2m})—O— \quad (2)$$

(here, m is an integer of 2 to 12), wherein said ether diol residue amounts to 65-98 wt. % of all the diol residues, and having a glass transition temperature of 90° C. or higher.

9 Claims, No Drawings

POLYCARBONATE AND PROCESS FOR PRODUCING THE SAME

This application is a 371 of PCT/JP04/08648 filed Jun. 14, 2004.

TECHNICAL FIELD

The present invention relates to polycarbonates containing a moiety which can be derived from a polysaccharide of renewable resources and having an excellent heat resistance, and methods for producing thereof.

BACKGROUND ART

Polycarbonates are generally produced by using raw materials which can be obtained from oil resources. Because of the concern about the exhaustion of oil resources, it is desired to produce polycarbonates by using raw materials obtainable from renewable resources such as plants.

On the other hand, an ether diol expressed by the following formula (3) can be easily prepared from renewable resource, for example, polysaccharide, starch or the like.

(3)

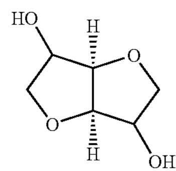

The ether diol has three kinds of stereoisomers. In concrete terms, they are 1,4:3,6-dianhydro-D-sorbitol (hereafter, this compound will be referred as to "isosorbide" in this description) expressed by the following formula (5), (5)

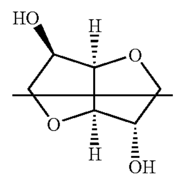

1,4:3,6-dianhydro-D-mannitol (hereafter, this compound will be referred as to "isomannide" in this description) expressed by the following formula (6), (6)

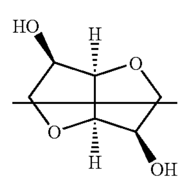

and 1,4:3,6-dianhydro-L-iditol (hereafter, this compound will be referred as to "isoidide" in this description) expressed by the following formula (7).

(7)

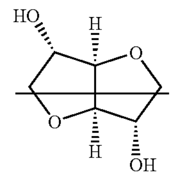

Isosorbide, isomannide and isoidide can be produced from D-glucose, D-mannose and L-idose, respectively. For example, isosorbide can be produced by hydrogenating D-glucose followed by dehydration with an acid catalyst.

Heretofore, it was studied to incorporate especially isosorbide among the above-mentioned ether diols into a polycarbonate as the main monomer (for example, German unexamined patent publication No. 2938464, Journal fuer praktische Chemie, p. 298-310, vol. 334, 1992, Macromolecules, p. 8077-8082, vol. 29, 1996, and Journal of Applied Polymer Science, p. 872-880, vol. 86, 2002).

However, isosorbide-derived polycarbonates have a problem of poor moldability, which is caused by extremely high glass transition temperatures and melt viscosities due to their rigid structures.

Further, methods for producing copolycarbonates which contain isosorbide and a diphenol of various types were reported (for example, JP-A 56-110723, Macromolecular Chemistry and Physics, p. 2197-2210, vol. 198, 1997, Journal of Polymer Science: Part A, p. 1611-1619, vol. 35, 1997, and Journal of Polymer Science: Part A, p. 1125-1133, vol. 37, 1999). These copolycarbonates have problems that the diphenols are derived from oil.

On the other hand, speaking of polycarbonates which are derived from aliphatic diols, glass transition temperatures of the polycarbonates which are derived from ethylene glycol, 1,4-butanediol, 1,5-pentanediol, 1,6-hexanediol or the like are 0-5° C., −35° C., −41° C. and −50° C., respectively (for example, Journal of Polymer Science: Polymer Letters Edition, p. 599-602, vol. 18, 1980, Macromolecular Chemistry and Physics, p. 97-102, vol. 199, 1998, and Polycarbonate resin handbook, edited by Seiichi Honma, Nikkan Kogyo|Shinbun|Co. p. 21, 1992).

It is possible to use renewable resources as these aliphatic diols, but aliphatic diol-derived polycarbonates are usually oily substances or solids with low melting points at the room temperature due to their flexible structures, and they have shortcomings of poor heat resistances. Polycarbonate copolymers derived from an aliphatic diol and having a higher glass transition temperature have never been reported.

Further, although reports concerning copolycarbonates of isosorbide and an aliphatic diol are few, as one of them we can find a report of copolycarbonates of an aliphatic diol such as 1,4-butanediol, 1,6-hexanediol, 1,8-octanediol or 1,10-decanediol, and isosorbide (for example, Okada et al, Abstract of the seventh open symposium on "Polymers with low environmental loads": Construction of a sustainable material system based on production of plastics with low environmental loads from renewable resources, Scientific Research on Priority Areas (B) supported by Grant-in-Aid for Scientific Research of Ministry of Education, Culture, Sports, Science and Technology, p. 26-29, 2002, and Journal of Polymer Science: Part A, p. 2312-2321, vol. 41, 2003).

These polycarbonates are block copolymers or random copolymers, and their glass transition temperatures become lower with increasing lengths of aliphatic chains. The temperatures have been determined as 65° C. or 59° C., 26° C. or 20° C., 12° C. or 23° C., and −1° C. or 7° C., respectively, and they are poor in heat resistances.

Further, JP-A 2003-292603, which was published after the date of the basic application of the present invention, describes a thermoplastic molding material containing a polycarbonate compound obtainable from isosorbide. Although the glass transition temperature of the thermoplastic molding material is sufficiently higher than the room temperature, further improvement of heat resistance is desired.

DISCLOSURE OF THE INVENTION

It is an object of the present invention to provide new polycarbonates containing a moiety which can be derived from renewable resources and having an excellent heat resistance and moldability.

Another object of the present invention is to provide a process which is excellent in cost and through which the polycarbonates can be simply produced.

Further other objects and merits of the present invention will be made clear by the following explanations.

The present invention relates to polycarbonates containing an ether diol residue producible from a polysaccharide and expressed by the following formula (1),

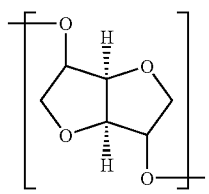

(1)

and a diol residue expressed by the following formula (2)

$$-O-(C_mH_{2m})-O- \quad (2)$$

(here, m is an integer of 2 to 12), wherein said ether diol residue amounts to 65-98 wt. % of all the diol residues, and having glass transition temperatures of 90° C. or higher. The present invention also relates to a method for producing the polycarbonates.

BEST MODE FOR CARRYING OUT THE INVENTION

Hereafter, the mode for carrying out the present invention will be explained further in detail, while the examples and explanations mentioned below are for exemplifying the present invention, and the present invention is not restricted by them. It is needless to say that other modes for carrying out the invention can be within the scope of the present invention as long as they conform to the objects of the present invention.

The polycarbonate of the present invention contains an ether diol residue expressed by the following formula (1)

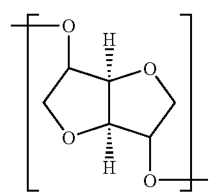

(1)

and a diol residue expressed by the following formula (2)

$$-O-(C_mH_{2m})-O- \quad (2)$$

(here, m is an integer of 2-12), wherein the ether diol residue amounts to 65-98 wt. % of all the diol residues, and the polycarbonate has a glass transition temperature of 90° C. or higher. It is preferable that the ether diol residues amount to 80-98 wt. % of all the diol residues.

That is, the polycarbonates of the present invention have a repeating unit moiety of formula (8)

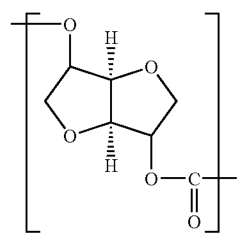

(8)

and a repeating unit moiety of formula (9)

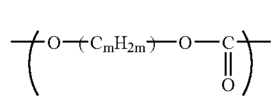

(9)

(here, m is an integer of 2 to 12).

When the content of the ether diol residue becomes lower than the above-mentioned range, the glass transition temperature of the resin to be obtained decreases, and the degree of polymerization hardly increases, so that the polymer becomes brittle. When the content of the ether diol exceeds the above-mentioned range, the glass transition temperature and the melt viscosity become extremely high, so that moldability becomes poor.

In the polycarbonate of the present invention, the diol residue expressed by the above-mentioned formula (2) is preferably at least one kind selected from the group consisting of an ethylene glycol residue, a 1,3-propanediol residue, a 1,4-butanediol residue, a 1,5-pentanediol residue and a 1,6-hexanediol residue.

It is also preferable that the polycarbonate contains another diol residues besides the ether diol residues and the diol residues expressed by the above-mentioned formula (2). Examples of another diol residues are alicyclic alkylenediols such as cyclohexanediol and cyclohexanedimethanol, aromatic diols such as dimethanolbenzene and diethanolbenzene, bisphenols etc. In this case, it is preferable that the total content of the third diol residues do not exceed 50 parts by weight against 100 parts by weight of the glycol residue of the above-mentioned formula (2).

Further, it is preferable that at least two kinds or more of the diol residues expressed by the above-mentioned formula (2) are used. When two kinds or more of the diol residues expressed by the above-mentioned formula (2) are used, the ratio of the diol residues is not specially restricted. It is preferable to use combinations of two kinds or more of diols selected from an ethylene glycol residue, a 1,3-propanediol residue, a 1,4-butanediol residue, a 1,5-pentanediol residue and a 1,6-hexanediol residue which have specially high degradability in nature. A more preferable combination is, for example, a 1,6-hexanediol residue and a 1,3-propanediol residue, or a 1,6-hexanediol residue and a 1,4-butanediol residue.

The polycarbonates of the present invention have a glass transition temperature of 90° C. or more. The glass transition temperature is an important factor for heat resistance of a molded product and melt moldability. The glass transition temperature is preferably not less than 100° C. nor more than 160° C. for keeping practically sufficient heat resistance and moldability.

Further, the polycarbonates of the present invention have a reduced viscosity of preferably 0.1 dl/g or more, more preferably 0.35 dl/g or more, and further more preferably 0.6 dl/g or more. When the reduced viscosity is in this range, the polycarbonates have good melt fluidity, and further they have sufficient mechanical strength.

The polycarbonates of the present invention can be produced from an ether diol expressed by the following formula (3),

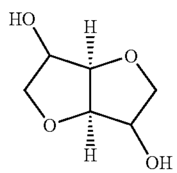

(3)

a diol expressed by the following formula (4), $$HO—(C_mH_{2m})—OH \quad (4)$$

(here, m is an integer of 2 to 12)

and a carbonic acid diester by a melt polymerization method.

Concrete examples of the ether diol include isosorbide, isomannide and isoidide, which are expressed by the above-mentioned formulae (5), (6) and (7), respectively, and others.

These polysaccharide-derived ether diols are materials which can be obtained also from biomass, and one of the materials which are called renewable resources. Isosorbide can be produced by hydrogenating D-glucose, which is obtainable from starch, and dehydrating the hydrogenated product. The other ether diols can be produced by the similar reactions using different starting materials.

Especially, a polycarbonate containing the isosorbide residue as the ether diol residue is preferable. Isosorbide is an ether diol which can easily be produced from starch or the like, so that it is abundantly obtainable as a raw |material|, and in addition, it is superior to isomannide and isoidide in all the points of easiness in production, excellences of properties and broad ranges of usage.

When the polycarbonate of the present invention contains the isosorbide residue as the ether diol residue, it is preferable that the isosorbide residue amounts to 65-98 wt. % of all the diol residues. It is more preferable that it amounts to 80-98 wt. % of all the diol residues.

The carbonic acid diester which is used in the production of the polycarbonate of the present invention is, for example, diphenyl carbonate, dinaphthyl carbonate, bis(diphenyl)carbonate, dimethyl carbonate, diethyl carbonate, dibutyl carbonate or the like. Among these carbonic acid diesters, diphenyl carbonate is preferable from the points of view of reactivity and cost.

In the production method of the present invention, a diol and a carbonic acid diester, which are raw materials, are subjected to a preliminary reaction by heating them at atmospheric pressure preferably in the presence of a polymerization catalyst, and subsequently they are stirred under reduced pressure while they are heated at 280° C. or less to distil |away| the formed phenol. The reaction system is preferably kept in an atmosphere of a gas such as nitrogen which is inert against the raw materials, the reaction mixture and the reaction product. Besides nitrogen, the other inert gas such as argon is available.

At the initial stage of the reaction, it is preferable to carry out the heating reaction at atmospheric pressure. This progresses an oligomer forming reaction, so that when an aromatic alcohol such as phenol or an aliphatic alcohol is distilled away by reducing pressure at the later stage of the reaction, it is prevented that unreacted monomer distills away to break the mole balance and lower the degree of polymerization. In the production method of the present invention, the reaction can be promoted by properly removing the aromatic alcohol or aliphatic alcohol from the system (reactor). For this purpose, it is effective and preferable to reduce the pressure of the system.

In the production method of the present invention, it is preferable to suppress the reaction temperature as low as possible in order to prevent the decomposition of the ether diol, and obtain a resin less colored and having a high viscosity. However, for promoting the polymerization reaction properly, the polymerization temperature is preferably in the range from 180° C. to 280° C., more preferably in the range from 230° C. to 260° C.

In the production method of the present invention, it is preferable to use catalysts. Usable catalysts are (i) a nitrogen-containing basic compound, (ii) an alkali metal compound, (iii) an alkaline earth metal compound etc. These can be used singly or in combination of two kinds or more, and combined usages of (i) and (ii), (i) and (iii), and (i), (ii) and (iii) are often preferable.

A preferable example of (i) is tetramethylammonium hydroxide, and preferable examples of (ii) are sodium salts, and among them the usage of 2,2-bis(4-hydroxyphenyl) propane disodium salt is especially preferable.

Further, to the polycarbonates of the present invention, various function-imparting agents are optionally added according to the use of the polycarbonates. Such agents are, for example, heat stabilizers, stabilization adjuvants, plasticizers, antioxidants, photostabilizers, nucleating agents, heavy metal-inactivating agents, flame retardants, lubricants, antistatic agents, ultraviolet absorbers etc.

Further, depending on the use, the polycarbonates of the present invention are optionally compounded with various organic or inorganic fillers, fibers etc. The examples of the filler are carbon, talc, montmorillonite, hydrotalcite etc., and the examples of the fiber are various synthetic fibers, glass fibers, quartz fibers, carbon fibers etc. in addition to natural fibers such as kenaf.

As mentioned above, we can obtain polycarbonates containing a moiety which can be derived from renewable resources, and having excellent heat resistance.

By virtue of excellent heat resistance, the polycarbonates of the present invention can be widely used for various uses including optical parts such as optical sheets, optical disks, information disks, and optical lenses and prisms, various machine parts, building materials, car components, and various resin trays and dishes. The polycarbonates can be used especially preferably as film molded items such as optical sheets among these uses.

By virtue of biodegradability, the polycarbonates of the present invention can be used as films and sheets for agricultural materials including green house films, mulch films etc., packaging films and sheets for uses including food wrapping, general packaging, compost bags etc., industrial materials including tapes etc., various packaging containers etc. and molded articles for various uses in which the prevention of environmental contamination are needed.

Further, the polycarbonates of the present invention can be used after they are mixed and alloyed with a bio-based polymer, a synthetic resin, a rubber or the like of various types, for example, an aromatic polyester, an aromatic polycarbonate, a polyamide, polystyrene, a polyolefin, polyacrylic acid, ABS, a polyurethane etc. in addition to polylactic acid and an aliphatic polyester.

EXAMPLES

Hereafter, the present invention will be explained in detail with examples, while the present invention is not restricted by the examples.

Evaluations in the examples were carried out as follows. Physical properties are shown collectively in Table 1.

(1) Measurement of glass transition temperature: Glass transition temperatures (Tg) were measured in a nitrogen stream at a temperature elevation rate of 20° C./min by using a differential scanning calorimeter of 910 Model manufactured by DuPont Co.

(2) Measurement of reduced viscosity: Reduced viscosities (dl/g) were measured on a solution obtained by dissolving 120 mg of a polycarbonate sample in 10 ml of a mixed solvent of phenol/tetrachloroethane (volume ratio of 50/50) at 30° C. using an Ubbelohde viscometer.

(3) Evaluation of moldability: Moldabilities were determined by molding a polycarbonate sample at a projection temperature of 240° C. and a mold temperature of 80° C. using a small-sized injection molding machine manufactured by Nissei Plastic Industrial Co., Ltd. Tensile tests were carried out according to ASTM D-683, and bending tests were carried out according to ASTM D-790.

(4) Evaluation of biodegradability: Into 200 g of a commercially available leaf mold (a bark compost manufactured by Sanyo-Bark) was added 1 liter of reservoir water, the mixture was aerated for 30 minutes or more at about 30° C. in a hot water bath. Then, the mixture was filtered through a filter paper. Into the filtrate was added 100 ml of optimized testing culture solution A (a solution obtained by dissolving 37.5 g of potassium dihydrogenphosphate, 72.9 g of disodium hydrogenphosphate and 2.0 g of ammonium chloride in 1 liter of ion exchanged water), and the total volume of the mixture was made 2 liters. The obtained solution was charged into a container that was placed in a constant temperature bath at 50° C., which is close to the compost condition, and it was aerated at a ventilation volume of 200 ml/min with pressurized air. The half of the culture solution was replaced with a newly prepared solution media every fourth or fifth day.

A test piece weighing about 200 mg was cut out from a film approximately 20 μm in thickness obtained by casting a solution prepared by dissolving a test polymer in dichloromethane on a glass base. The test piece was charged into a commercially available nonwoven cloth bag, and the bag was placed in the above-mentioned container. The bag was taken out after 3 months. The weight decreasing rate of the test piece was determined, and thus the biodegradability was evaluated.

Example 1

Into a reactor were charged 29.23 parts by weight of isosorbide, 1.51 parts by weight of ethylene glycol and 49.48 parts by weight of diphenyl carbonate, and further $2\times10^{-3}$ parts by weight of tetramethylammonium hydroxide ($1\times10^{-4}$ mol of this compound to 1 mol of the diol component) and $30\times10^{-4}$ parts by weight of 2,2-bis(4-hydroxyphenyl)propane disodium salt ($0.5\times10^{-6}$ mol of this compound to 1 mol of the diol component), and they were melted at 180° C. under a nitrogen atmosphere.

The reaction was carried out for 20 minutes under stirring while the formed phenol was distilled away by reducing the inside pressure of the reactor to $13.3\times10^{-3}$ MPa. Subsequently, after the temperature was raised to 200° C., the pressure was reduced gradually, and the reaction was carried out for 25 minutes at $4.00\times10^{-3}$ MPa while phenol was distilled away. Further, the reaction was carried out for 10 minutes after the temperature was raised to 215° C.

Subsequently, the pressure was gradually reduced, the reaction was carried out for 10 minutes at $2.67\times10^{-3}$ MPa, and for 10 minutes at $1.33\times10^{-3}$ MPa. When the pressure reached to $4.00\times10^{-5}$ MPa, the temperature was gradually raised up to 250° C., and finally the reaction was carried out further for 1 hour at 250° C. at $6.66\times10^{-5}$ MPa.

The obtained polymer had a reduced viscosity of 0.353 dl/g and a glass transition temperature of 157.4° C.

Examples 2 to 5

Isosorbide, ethylene glycol and diphenyl carbonate having amounts shown in Table 1 were charged into a reactor. As polymerization catalysts, tetramethylammonium hydroxide and 2,2-bis(4-hydroxyphenyl)propane disodium salt were charged at the same ratios of concentrations as Example 1, they were melted at 180° C. under a nitrogen atmosphere, and polymerization reaction was carried out in the same manner as Example 1 to obtain a polymer. The reduced viscosity and glass transition temperature of the polymer are shown in Table 1.

Example 6 to 8

Isosorbide, 1,3-propanediol and diphenyl carbonate having amounts shown in Table 1 were charged into a reactor. As polymerization catalysts, tetramethylammonium hydroxide and 2,2-bis(4-hydroxyphenyl)propane disodium salt were charged at the same ratios of concentrations as Example 1, and they were melted at 180° C. under a nitrogen atmosphere.

Polymerization reaction was carried out in the same manner as Example 1 to obtain a polymer. The reduced viscosity and glass transition temperature of the polymer are shown in Table 1.

By using the polymer obtained in Example 6, a dumbbell-shaped molded piece, that is, a tabular molded piece of 120 mm×12 mm×3 mm was produced, and the moldability was evaluated. The results are shown in Table 3.

A film was produced from the polymer obtained in Example 6, and the biodegradability was evaluated. The reduction in weight of the test piece was 15.9%.

Examples 9 to 10

Isosorbide, 1,4-butanediol and diphenyl carbonate having amounts shown in Table 1 were charged into a reactor. As polymerization catalysts, tetramethylammonium hydroxide and 2,2-bis(4-hydroxyphenyl)propane disodium salt were charged at the same ratios of concentrations as Example 1, and they were melted at 180° C. under a nitrogen atmosphere. Polymerization reaction was carried out in the same manner as Example 1 to obtain a polymer. The reduced viscosity and glass transition temperature of the polymer are shown in Table 1.

By using the polymer obtained in Example 10, a dumbbell-shaped molded piece, that is, a tabular molded piece of 120 mm×12 mm×3 mm was produced, and the moldability was evaluated. The results are shown in Table 3.

Examples 11 to 12

Isosorbide, 1,5-pentanediol and diphenyl carbonate having amounts shown in Table 1 were charged into a reactor. As polymerization catalysts, tetramethylammonium hydroxide and 2,2-bis(4-hydroxyphenyl)propane disodium salt were charged at the same ratios of concentrations as Example 1, and they were melted at 180° C. under a nitrogen atmosphere. Polymerization reaction was carried out in the same manner as Example 1 to obtain a polymer. The reduced viscosity and glass transition temperature of the polymer are shown in Table 1.

Examples 13 to 16

Isosorbide, 1,6-hexanediol and diphenyl carbonate having amounts shown in Table 2 were charged into a reactor. As polymerization catalysts, tetramethylammonium hydroxide and 2,2-bis(4-hydroxyphenyl)propane disodium salt were charged at the same ratios of concentrations as Example 1, and they were melted at 180° C. under a nitrogen atmosphere. Polymerization reaction was carried out in the same manner as Example 1 to obtain a polymer. The reduced viscosity and glass transition temperature of the polymer are shown in Table 2.

By using the polymer obtained in Example 15, a dumbbell-shaped molded piece, that is, a tabular molded piece of 120 mm×12 mm×3 mm was produced, and the moldability was evaluated. The results are shown in Table 3.

A film was produced from the polymer obtained in Example 11, and the biodegradability was evaluated. The reduction in weight of the test piece was 15.6%.

Example 17 to 21

Isosorbide, 1,6-hexanediol, 1,3-propanediol and diphenyl carbonate having amounts shown in Table 2 were charged into a reactor. As polymerization catalysts, tetramethylammonium hydroxide and 2,2-bis(4-hydroxyphenyl)propane disodium salt were charged at the same ratios of concentrations as Example 1, and they were melted at 180° C. under a nitrogen atmosphere. Polymerization reaction was carried out in the same manner as Example 1 to obtain a polymer. The reduced viscosity and glass transition temperature of the polymer are shown in Table 2.

By using the polymer obtained in Example 17, a dumbbell-shaped molded piece, that is, a tabular molded piece of 120 mm×12 mm×3 mm was produced, and the moldability was evaluated. The results are shown in Table 3.

Example 22

Into a reactor were charged 23.38 parts by weight of isosorbide, 2.36 parts by weight of 1,6-hexanediol, 1.80 parts by weight of 1,4-butanediol and 42.84 parts by weight of diphenyl carbonate. As polymerization catalysts, tetramethylammonium hydroxide and 2,2-bis(4-hydroxyphenyl) propane disodium salt were charged at the same ratios of concentrations as Example 1, and they were melted at 180° C. under a nitrogen atmosphere.

Polymerization reaction was carried out in the same manner as Example 1 to obtain a polymer. The reduced viscosity and glass transition temperature of the polymer are shown in Table 2.

Example 23

Into a reactor were charged 24.84 parts by weight of isosorbide, 1.80 parts by weight of 1,4-butanediol, 1.24 parts by weight of ethylene glycol and 44.99 parts by weight of diphenyl carbonate. As polymerization catalysts, tetramethylammonium hydroxide and 2,2-bis(4-hydroxyphenyl) propane disodium salt were charged at the same ratios of concentrations as Example 1, and they were melted at 180° C. under a nitrogen atmosphere. Polymerization reaction was carried out in the same manner as Example 1 to obtain a polymer. The reduced viscosity and glass transition temperature of the polymer are shown in Table 2.

Comparative Examples 1 to 4

Isosorbide shown in Table 2 and various types of diphenyl carbonate 44.1 parts by weight were charged into a reactor. As polymerization catalysts, tetramethylammonium hydroxide and 2,2-bis(4-hydroxyphenyl)propane disodium salt were charged at the same ratios of concentrations as Example 1, and they were melted at 180° C. under a nitrogen atmosphere.

Polymerization reaction was carried out in the same manner as Example 1 to obtain a polymer. The reduced viscosity and glass transition temperature of the polymer are shown in Table 2.

TABLE 1

| | Isosorbide (pts. wt.) | Kind of aliphatic alkylene glycol | Aliphatic alkylene glycol (pts. wt.) | Diphenyl carbonate (pts. wt.) | Isosorbide (mol %) | Aliphatic alkylene glycol (mol %) | Ratio of isosorbide residue in all diol residues (wt. %) | Ratio of isosorbide residue in all weight (wt. %) | Reduced viscosity | Glass transition temperature (° C.) |
|---|---|---|---|---|---|---|---|---|---|---|
| Example 1 | 29.23 | Ethylene glycol | 1.51 | 49.48 | 89.3 | 10.7 | 97.8 | 95.9 | 0.353 | 157.4 |
| Example 2 | 29.23 | | 3.18 | 55.48 | 79.7 | 20.3 | 95.5 | 93.6 | 0.241 | 154.1 |
| Example 3 | 21.92 | | 3.87 | 46.91 | 63.5 | 36.5 | 93.1 | 91.1 | 0.191 | 130.1 |
| Example 4 | 21.92 | | 5.37 | 52.7 | 70.8 | 29.2 | 90.4 | 88.5 | 0.149 | 117.2 |
| Example 5 | 14.61 | | 6.08 | 41.99 | 50 | 50 | 70.3 | 68.4 | 0.128 | 107.3 |
| Example 6 | 23.38 | 1,3-Propanediol | 3.04 | 42.84 | 80 | 20 | 88.5 | 72.6 | 0.902 | 143.8 |
| Example 7 | 26.31 | | 1.52 | 42.84 | 90 | 10 | 94.5 | 78.3 | 0.298 | 150.7 |
| Example 8 | 20.46 | | 4.57 | 42.84 | 70 | 30 | 81.7 | 66.4 | 0.293 | 143.4 |
| Example 9 | 26.3 | 1,4-Butanediol | 1.8 | 42.84 | 90 | 10 | 93.6 | 77.6 | 1.155 | 156.7 |
| Example 10 | 23.38 | | 3.6 | 42.84 | 80 | 20 | 86.6 | 71.4 | 0.775 | 138.0 |
| Example 11 | 23.38 | 1,5-Pentanediol | 4.17 | 42.84 | 80 | 20 | 84.8 | 70.1 | 1.115 | 126.7 |
| Example 12 | 20.46 | | 6.25 | 42.84 | 70 | 30 | 76.5 | 62.9 | 0.585 | 90.4 |

TABLE 2

| | Isosorbide (pts. wt.) | Kind of aliphatic alkylene glycol | Aliphatic alkylene glycol (pts. wt.) | Diphenyl carbonate (pts. wt.) | Isosorbide (mol %) | Aliphatic alkylene glycol (mol %) | Ratio of isosorbide residue in all diol residues (wt. %) | Ratio of isosorbide residue in all weight (wt. %) | Reduced viscosity | Glass transition temperature (° C.) |
|---|---|---|---|---|---|---|---|---|---|---|
| Example 13 | 26.31 | 1,6-Hexanediol | 2.36 | 42.84 | 90 | 10 | 91.7 | 76.3 | 0.932 | 145.2 |
| Example 14 | 24.84 | | 3.55 | 42.84 | 85 | 15 | 87.4 | 72.7 | 0.704 | 131.2 |
| Example 15 | 23.38 | | 4.73 | 42.84 | 80 | 20 | 83.0 | 68.9 | 1.139 | 122.6 |
| Example 16 | 20.46 | | 7.09 | 42.84 | 70 | 30 | 74.1 | 61.3 | 1.168 | 95.6 |
| Example 17 | 23.38 | Two kinds of diols (see notes) | HD11.8 PD2.28 | 42.84 | 80 | HD5 PD15 | 87.0 | 71.7 | 1.055 | 139.4 |
| Example 18 | 23.38 | | HD2.36 PD1.52 | 42.84 | 80 | HD10 PD10 | 85.7 | 70.7 | 0.986 | 131 |
| Example 19 | 20.46 | | HD2.36 PD3.04 | 42.84 | 70 | HD10 PD20 | 76.5 | 64.6 | 0.825 | 109.4 |
| Example 20 | 20.46 | | HD3.55 PD2.28 | 42.84 | 70 | HD15 PD15 | 77.7 | 63.8 | 1.026 | 108.6 |
| Example 21 | 20.46 | | HD4.73 PD1.52 | 42.84 | 70 | HD20 PD10 | 79.0 | 62.9 | 0.914 | 101.7 |
| Example 22 | 23.38 | | HD2.36 BD1.80 | 42.84 | 80 | HD10 BD10 | 84.8 | 70.1 | 0.921 | 129.2 |
| Example 23 | 24.84 | | BD1.80 EG1.24 | 44.99 | 85 | BD10 EG5 | 92.1 | 75.9 | 0.556 | 149.9 |
| Comparative Example 1 | 29.23 | — | — | 44.13 | — | — | 100.0 | 83.5 | 0.457 | 163.7 |
| Comparative Example 2 | 14.61 | 1,3-Propanediol | 7.61 | 44.99 | 50 | 50 | 65.7 | 52.2 | 0.166 | 63.3 |
| Comparative example 3 | 14.61 | 1,4-Butanediol | 9.01 | 44.99 | 50 | 50 | 61.7 | 49.6 | 0.104 | (Not measurable) |
| Comparative example 4 | 17.54 | 1,6-Hexanediol | 9.45 | 42.84 | 60 | 40 | 64.7 | 53.4 | 1.193 | 71.2 |

(Notes):
EG—Ethylene glycol,
PD—1,3-Propanediol,
BD—1,4-butanediol,
PeD—1,5-Pentanediol,
HD—1,6-Hexanediol

TABLE 3

| | Example 6 | Example 10 | Example 15 | Example 17 |
|---|---|---|---|---|
| Tensile modulus [MPa] | 3100 | 2632 | 2426 | 2534 |
| Tensile stress at yield [MPa] | 85 | 74.2 | 63 | 70.4 |
| Elongation at break[%] | 4.6 | 5.5 | 4.8 | 5.3 |
| Elongation at yield [%] | 15 | — | 4.8 | — |
| Flexural modulus [MPa] | 2993 | 3327 | 3066 | 2742 |
| Flexural strength [MPa] | 37 | 143 | 128 | 118 |

The invention claimed is:

1. A polycarbonate containing an ether diol residue producible from a polysaccharide and expressed by the following formula (1),

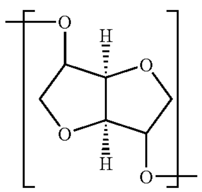

(1)

and a diol residue expressed by the following formula (2)

$$—O—(C_mH_{2m})—O— \quad (2)$$

(here, m is an integer selected from 2, 3 and 6), wherein said ether diol residue amounts to 65-98 wt. % of all the diol residues, and having a glass transition temperature of 100 to 160° C.

2. The polycarbonate according to claim 1 containing at least two kinds of the diol residues expressed by the formula (2).

3. The polycarbonate according to claim 1 containing the isosorbide residue as the ether diol residue.

4. The polycarbonate according to claim 3, wherein the isosorbide residue amounts to 65 to 98 wt. % of all the diol residues.

5. A method for producing the polycarbonate according to claim 1, wherein the polycarbonate is produced from an ether diol expressed by the following formula (3),

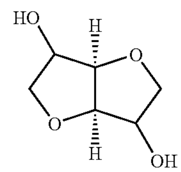

(3)

a diol expressed by the following formula (4)

$$HO—(C_mH_{2m})—OH \quad (4)$$

(here, m is an integer selected from 2, 3 and 6) and a carbonic acid diester by a melt polymerization method.

6. The polycarbonate-producing method according to claim 5, wherein an ether diol expressed by the above-mentioned formula (3), a diol expressed by the above-mentioned formula (4) and a carbonic acid diester are subjected to a thermal reaction at atmospheric pressure in the presence of polymerization catalysts, and subsequently the reaction product is subjected to melt polycondensation under reduced pressure while heated at a temperature in the range of 180° C. to 280° C.

7. The polycarbonate-producing method according to claim 6, wherein at least one compound selected from the group consisting of nitrogen-containing basic compounds, alkali metal compounds and alkaline earth metal compounds is used as the polymerization catalysts.

8. The polycarbonate-producing method according to claim 7, wherein tetramethylammonium hydroxide and 2,2-bis(4-hydroxyphenyl)propane disodium salt are used as the polymerization catalysts.

9. The polycarbonate-producing method according to claim 5, wherein diphenyl carbonate is used as the carbonic acid diester.

* * * * *